Oct. 22, 1968  K. O. FRENTZEL  3,406,582
AUTOMATIC BELT TENSIONING DEVICE
Filed July 31, 1967  2 Sheets-Sheet 2
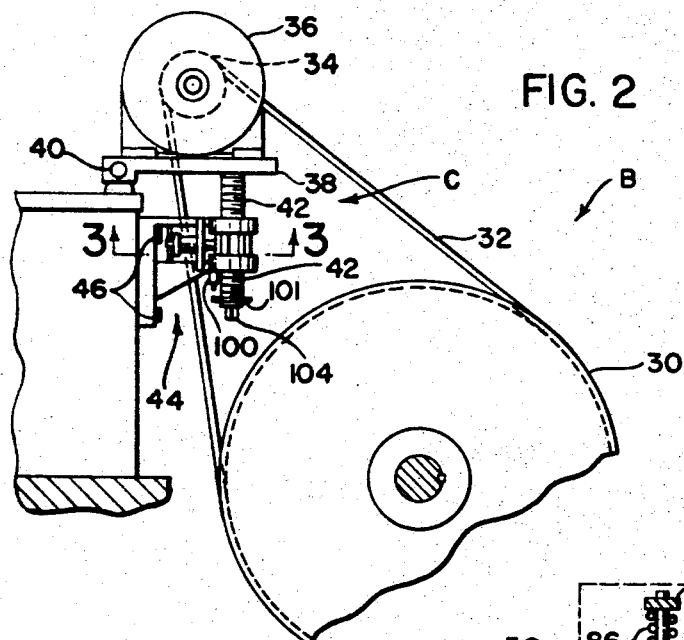
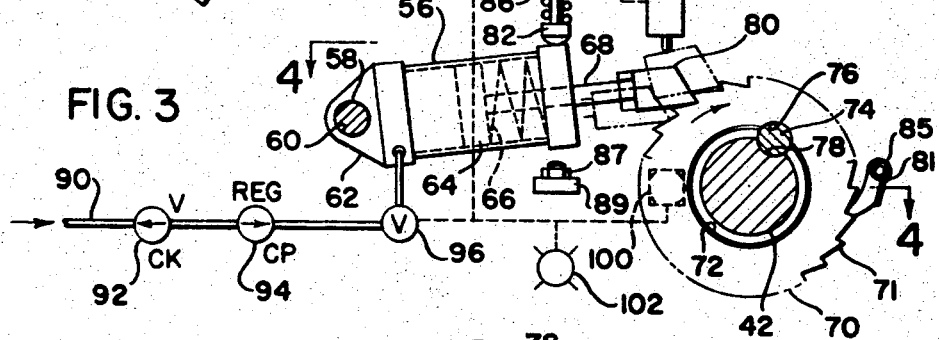
INVENTOR.
KARL O. FRENTZEL
BY
Meyer, Tilberry & Body
ATTORNEYS

United States Patent Office 3,406,582
Patented Oct. 22, 1968

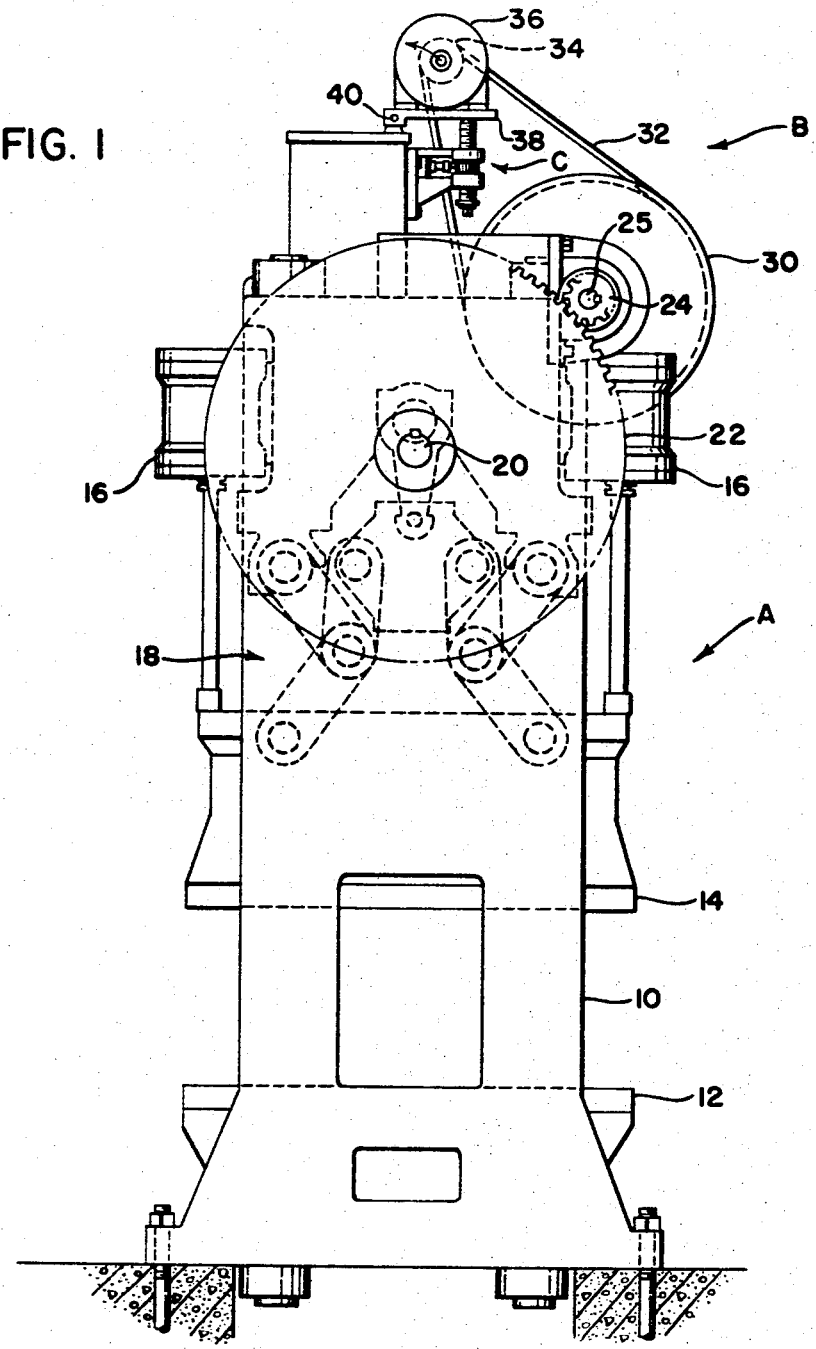

3,406,582
AUTOMATIC BELT TENSIONING DEVICE
Karl O. Frentzel, Canton, Ohio, assignor to E. W. Bliss Company, Canton, Ohio, a corporation of Delaware
Filed July 31, 1967, Ser. No. 657,371
6 Claims. (Cl. 74—242.14)

ABSTRACT OF THE DISCLOSURE

An apparatus for constantly maintaining any desired predetermined tension in a power transmitting drive belt, conveyor belt, or roller chain. The apparatus disclosed includes a screw shaft mounted in threaded openings in a bracket and arranged to move against a belt tensioning member. A ratchet wheel surrounds the screw shaft and is in rotary driving engagement therewith through a drive pin which engages a longitudinal groove in the shaft. This allows the shaft to move longitudinally of the ratchet wheel during rotation. The means for rotating the ratchet wheel includes an air cylinder having a reciprocated piston driving a drive pawl which engages the ratchet wheel. Means are also provided for indicating excessive movement of the shaft to, thus, give an indication of excessive "stretch" of the belt being tensioned.

---

The present invention is desired toward the transmission art and, more particularly, to an improved apparatus for maintaining a predetermined constant tension on a drive belt, conveyor belt or roller chain.

The invention is especially useful for controlling the tension in the drive belts of a press and will be described with particular reference thereto; however, it will be appreciated that the invention is capable of broader application and could be used wherever it is desired to maintain a predetermined tension in any type of endless, flexible power transmitting element.

It is well known that in belt-type drive, means must be provided to maintain the belts under a predetermined tension to assure proper power transmission. Generally, the tensioning means have comprised mounting the belt pulleys or sheaves so that the distance between their center lines could be adjusted or, alternately, providing an adjustably mounted idler pulley. In most cases, these pulleys were adjusted through the use of a manually rotatable bolt, adjusting screw, or turnbuckle arrangement.

These prior arrangements were generally unsatisfactory since it was difficult to obtain and maintain the most desirable tension on the belts. If the belts were not tensioned sufficiently slippage resulted; whereas, if they were over-tensioned, their service life was substantially reduced. Additionally, because of the stretch which normally occurs during the lift of a drive belt, periodic readjustment of these adjusting mechanisms was required.

Although some attempts were made to design tensioning systems utilizing air hydraulic cylinders to apply the tensioning force to the belts, these systems have generally been impractical. First, failure of air or hydraulic pressure resulted in complete loss of tensioning force. And, secondly, variations in air or hydraulic pressure produced substantial variations in tensioning force.

The present invention overcomes the above problems and provides a belt tensioning apparatus which automatically maintains any constant predetermined tension on the belt. The apparatus functions to automatically maintain the belt under a constant tension irrespective of belt "stretch" or wear.

In accordance with the present invention, a power transmission system of the type including an endless belt and a movable member mounted for movement in a first direction for producing tension in the belt is provided with the improvement comprising means for applying a force to the member to automatically maintain a predetermined tension in the belt irrespective of changes in the length of the belt. These means include: an elongated shaft drivingly connected with the movable member and mounted for axial movement in said first direction in response to rotation thereof; a fluid cylinder (either hydraulic or pneumatic); a piston in the cylinder and reciprocable therein; a piston rod connected to the piston and extending from the cylinder; a mechanical drive connection means between the piston rod and the shaft for causing the shaft to be rotated and move in the first direction in response to reciprocation of the piston; and, means for supplying fluid to said cylinder at a selectively variable constant pressure to produce reciprocation of the piston.

Because of the arrangement of the mechanical drive between the fluid cylinder and the shaft, failure of fluid pressure does not cause loss of tension in the belt. Further, the arrangement provides a constant force acting through the shaft to tension the belt, and any stretch of the belt is automatically taken up by movement of the shaft.

Accordingly, a primary object of the invention is the provision of a belt tensioning apparatus which functions to automatically maintain a constant tension on the belt throughout its service life.

An additional object of the invention is the provision of a belt tensioning apparatus which does not require periodic readjustment.

A further object is the provision of a belt tensioning apparatus which is simple in construction and reliable in operation.

A still further object is the provision of a belt tensioning system wherein a fluid cylinder provides the tensioning force and is arranged so that loss of fluid pressure cannot result in a loss of tensioning in the belt.

These and other objects and advantages will become apparent from the following description used to illustrate a preferred embodiment of the invention when read in conjunction with the accompanying drawings wherein:

FIGURE 1 is an elevational view of a press having a drive system provided with an improved belt tensioning arrangement constructed in accordance with the present invention;

FIGURE 2 is an enlarged side elevation of the belt drive system shown in FIGURE 1;

FIGURE 3 is a somewhat diagrammatic cross-sectional view taken on line 3—3 of FIGURE 2; and FIGURE 4 is a cross-sectional view taken on line 4—4 of FIGURE 3.

Referring now to the drawings wherein the showings are for the purpose of illustrating a preferred embodiment of the invention only and not for the purpose of limiting same, FIGURE 1 shows the overall arrangement of a conventional metal working press A having a belt drive system B provided with an improved belt tensioning arrangement C constructed in accordance with the present invention.

The press A forms no part of the present invention and has been shown merely to illustrate one possible environment in which the invention can be utilized. As shown however, the press comprises a vertically extending frame 10 supporting a bed 12 and a reciprocable ram or slide 14. Ram 14 is supported by conventional counterbalance cylinders 16 and reciprocated by any convenient drive such as toggle type drive 18 actuated from a crankshaft 20 which is rotated through a main gear 22. As shown, main gear 22 meshes with a pinion gear 24 that is keyed to the end of a transversely extending shaft 25. The shaft 25 is rotated via a flywheel 30 which forms part of belt drive assembly B.

Belt drive assembly B could take a variety of forms; however, as shown it includes a V-belt 32 received in V-belt grooves machined in flywheel 30 and driven via a pulley 34 keyed or otherwise positively connected to the drive shaft of a conventional electric motor 36. As is conventional in such systems, means must be provided to vary the distance between the lines of the driving pulley and the flywheel to vary the tension on the drive belt. Alternately, means such as an idler pulley biased or moved in a direction transverse to the path of movement of the pulley 32 must be provided.

In the particular embodiment shown, the distance between the centers of flywheel 30 and pulley 34 is variable by virtue of motor 36 being mounted on a movable support member 38 which is arranged for pivotal movement about a pivot 40 connected to the press frame 10.

As previously discussed, it has been the practice to adjust the position of such movable support members as member 38 by simple manually adjustable screw, bolt or turnbuckle arrangements. The present invention, however, provides an automatic arrangement which maintains a constant uniform tension on the drive belt. As best shown in FIGURES 2 through 4, this arrangement includes an elongated threaded shaft 42 whose upper end is drivingly engaged with the outer free end of support member 38. Shaft 42 is supported for movement in a vertical direction to maintain tension on belt 32 by a stationary bracket 44 which is positively connected to press frame 10, such as by bolts or screws 46. Bracket 44 includes a pair of spaced horizontally extending parallel arms 48 and 50 having threaded openings 52 and 54, respectively. Shaft 42 is threadedly received in openings 52 and 54 so, consequently, rotation of the shaft causes it to move vertically to move support member 38 in a direction to tension belt 32.

The means for providing the force required for rotating shaft 42 includes a fluid cylinder 56 which is supported in cantilever fashion by a rod 58 which extends between bracket arms 48 and 50 and is closely received in an opening 60 formed in a bracket 62 connected to the end of cylinder 56. A collar 63 is positioned about rod 58 so as to support cylinder 56 therefrom but allow it to have oscillatory motion relative thereto. As shown in FIGURE 3, a piston 64 is carried in cylinder 56 and arranged for reciprocation therein. A spring 66 serves to bias piston 64 to the left end of the cylinder as viewed in FIGURE 3. A piston rod 68 is connected to the piston and extends outwardly through the end of the cylinder. The end of the piston rod 68 is drivingly connected with shaft 42 by a mechanical drive connection which includes a ratchet wheel 70 having a toothed outer periphery 71. An opening 72, of a diameter slightly larger than the maximum diameter of shaft 42, extends through the ratchet wheel 70. The wheel 70 is positioned in surrounding relationship to the shaft and between the outer ends of the parallel bracket arms 48 and 50.

Ratchet wheel 70 is connected with shaft 42 so as to be capable of imparting rotary motion to the shaft while permitting it to move longitudinally. This connection includes a short cylindrical drive pin 74 which is received in a semicylindrical opening 76 formed inwardly of opening 72. Pin 74 is slidably received in a corresponding semicylindrical groove 78 formed longitudinally of shaft 42. This arrangement provides a keyed type connection between the ratchet wheel and the shaft so that the shaft is free to move vertically during rotation.

A pawl 80 is positively connected to the end of piston rod 68 and arranged to drivingly engage the toothed periphery of the ratchet wheel 70. As is apparent, reciprocation of the pawl will produce a clockwise motion of the ratchet wheel and corresponding clockwise rotation and vertical movement of threaded shaft 42. Counterclockwise rotation of wheel 70 during reciprocation of the piston to the left would normally not occur because of friction between the shaft and the bracket; however, in order to positively prevent any counterclockwise rotation a locking pawl 81 is provided. Locking pawl 81 is carried by the lower bracket arm 50 and biased into engagement with ratchet wheel 70 by a spring 85.

In order to maintain pawl 80 in engagement with the periphery of ratchet wheel 70 during its reciprocation, a pin 82 carried by a vertically extending bracket 84, connected by bolts 85 to the upper and lower bracket arms is utilized to apply a clockwise bias to cylinder 56. The extent of movement of the cylinder in the clockwise direction is limited by an adjustable screw carried by a bracket 89 arranged in the same manner as bracket 84 but on the opposite side of bracket 44.

In order to maintain a constant belt tensioning force, fluid under substantially constant pressure is supplied to cylinder 56. For this reason an air supply line 90 is connected with the cylinder through a check valve 92, a manually adjustable constant pressure regulating valve 94, and a two-positioned, three-way solenoid valve 96. Valve 96 is arranged so that in one position air from line 90 is supplied to the cylinder, while, in a second position, flow through line 90 is blocked and the air within the cylinder is exhausted to atmosphere. Consequently, when air is supplied to the cylinder a force is produced tending to move the piston and the drive pawl to the right as viewed in FIGURE 3. This force is transmitted through the ratchet wheel and shaft and, accordingly, produces vertical movement of the shaft 42 if the tension force in the belt is insufficient. However, when the air within the cylinder is exhausted to atmosphere the spring 66 functions to move the piston and pawl to the left placing it in position to again apply force to the drive connection.

In order to control the functioning of valve 96, a switch 98 is supported from bracket arm 48 and arranged to be actuated by the back surface of pawl 80. As shown, when the pawl 80 has been moved to the right most dotted line position the switch 98 is closed energizing valve 96 to its exhaust position.

Because the air cylinder is drivingly connected with the shaft 42 through a mechanical connection which prevents reverse (i.e., downward) movement of the shaft, failure of air pressure will not produce complete loss of tension in the belt. Rather, the shaft will be maintained at the position it had at the time air failure occurred.

As is apparent, once the air cylinder has driven shaft 42 to the extent that the force generated by the tension device is counterbalanced by the tension produced in belt 32, further movement of the shaft 42 will cease, except in response to stretch or breakage of the belt. Because a uniform force, controlled by the setting of pressure regulating valve 94, is always acting to tension the belt, a uniform tension must be maintained in the belt.

Should the belt break or stretch beyond a desired amount, the system provides an indication of the undesirable condition. As shown, a switch 100 is connected to the underside of bracket arm 50 and arranged to be actuated by an adjustable collar 101 carried on the lower end of shaft 42. Switch 100 is connected in parallel with switch 98 through a warning light 102. Thus, when the shaft 42 and, consequently, movable member 38, have moved beyond a predetermined amount in the vertical direction, air flow to the cylinder is stopped and a visible indication of the need of belt replacement is given to the press operator.

In order to permit the shaft 42 to be moved downward for belt replacement, wrench receiving flats 104 are formed on its lower end. Thus, when it is required to replace a belt, locking pawl 81 is held away from the ratchet wheel and the shaft 42 freely rotated to lower it. After the belt has been replaced and the supply of air restored to the cylinder 56, the cylinder will quickly drive the shaft vertically until the desired tension is induced in the new belt.

As is apparent from the foregoing description the present invention provides a highly reliable belt tension system. The invention has been described in great detail sufficient to enable one of ordinary skill in the transmission art to make and use the same. Obviously, modifications and alterations of the preferred embodiment will occur to others upon a reading and understanding of this specification and it is my intention to include all such

Having thus described my invention, I claim:

1. In a power transmission system including an endless flexible power transmitting element and a movable member mounted for movement in a first direction for producing tension in said element, the improvement comprising: means for applying a force to said member to automatically maintain a predetermined tension in said element irrespective of changes in the length of said element, said means including an elongated shaft drivingly connected with said movable member and mounted for axial movement in said first direction in response to rotation thereof; a fluid cylinder; a piston in said cylinder and recpirocable therein; a piston rod connected to said piston and extending from said cylinder; a mechanical drive connection means between said piston rod and said shaft for causing said shaft to be rotated and moved in said first direction in response to reciprocation of said piston; and, means for periodically supplying fluid to said cylinder at a selectively variable constant pressure to produce reciprocation of said piston.

2. The improvement as defined in claim 1 including means for discontinuing the supply of fluid to said cylinder in response to a predetermined amount of movement of said movable member.

3. The improvement as defined in claim 1 wherein said shaft is a screw shaft mounted in threaded openings, a stationary bracket and, wherein said mechanical drive connection means includes a ratchet wheel means for rotating said shaft in response to reciprocation of said piston.

4. The improvement as defined in claim 3 including means preventing rotation of said ratchet wheel means except in response to reciprocation of said piston.

5. The improvement as defined in claim 1 wherein said means for periodically supplying fluid to said cylinder includes a switch actuated in response to movement of said drive connection means.

6. The improvement as defined in claim 1 wherein said shaft includes means permitting it to be manually moved in a direction opposite to said first direction.

References Cited

UNITED STATES PATENTS

| | | | |
|---|---|---|---|
| 2,224,813 | 12/1940 | Geer | 74—242.15 XR |
| 2,509,458 | 5/1950 | Smith | 74—242.15 XR |
| 3,098,397 | 7/1963 | Schaefer | 74—242.14 |
| 3,132,596 | 5/1964 | Dinger | 74—242.15 XR |
| 3,187,674 | 6/1965 | Hammelmann | 74—242.15 XR |

FRED C. MATTERN, JR., *Primary Examiner.*

J. A. WONG, *Assistant Examiner.*